US005591323A

United States Patent [19]

Marcilly et al.

[11] Patent Number: 5,591,323
[45] Date of Patent: Jan. 7, 1997

[54] PROCESS FOR SWEETENING PETROLEUM CUTS WITHOUT REGULAR ADDITION OF ALKALINE SOLUTION USING A BASIC SOLID CATALYST

[75] Inventors: Christian Marcilly, Houilles; Serge Leporq, Mantes la Ville; Philippe Courty, Houilles, all of France

[73] Assignee: Institut Francais du Petrole, France

[21] Appl. No.: 474,766

[22] Filed: Jun. 7, 1995

Related U.S. Application Data

[63] Continuation of Ser. No. 105,998, Aug. 13, 1993, abandoned.

[51] Int. Cl.⁶ .................... C10G 27/00; C10G 27/04
[52] U.S. Cl. .................... 208/207; 208/189; 208/203; 208/206
[58] Field of Search .................... 208/189, 191, 208/207, 226, 230, 245, 203, 206

[56] References Cited

U.S. PATENT DOCUMENTS

| | | | |
|---|---|---|---|
| 2,988,500 | 6/1961 | Gleim et al. | 208/206 |
| 3,733,303 | 5/1973 | Adachi et al. | |
| 4,498,978 | 2/1985 | Frame | 208/207 |
| 4,672,047 | 6/1987 | Chandler | 502/62 |
| 4,794,097 | 12/1988 | Marty et al. | |
| 5,026,474 | 6/1991 | Blondeau et al. | 208/189 |
| 5,053,056 | 10/1991 | Montagne et al. | |
| 5,061,291 | 10/1991 | Sung | |
| 5,069,777 | 12/1991 | Orgebin et al. | |
| 5,234,476 | 8/1993 | Garapon et al. | |
| 5,271,835 | 12/1993 | Goravvara et al. | 208/228 |

FOREIGN PATENT DOCUMENTS

| | | |
|---|---|---|
| 530094 | 3/1993 | European Pat. Off. |
| 2252853 | 1/1988 | France |
| 2651791 | 3/1991 | France |
| 2688223 | 9/1993 | France |

OTHER PUBLICATIONS

Berg, L. G. et al. "Nature of thermal effects of the products of the reaction of kaolinite with some bases", I2V. Vyssh. Urcheb Zaved., Khim. tehnol., 13(1), 93.6 (Russia) 1970.

Berg, L. G., et al., "Nature of thermal effects of the products of . . . ", Anim. Tekhnol, 13 (1), 93–6 (Russia) 1970.

Primary Examiner—Asok Pal
Assistant Examiner—Bekir L. Yildirim
Attorney, Agent, or Firm—Millen, White, Zelano, & Branigan, P.C.

[57] ABSTRACT

A process for sweetening a petroleum cut containing mercaptans, wherein said petroleum cut is subjected to oxidation conditions by being contacted with a porous catalyst, in the presence of air said process being characterised in that said catalyst comprises 10 to 98% by weight of at least one mineral solid phase constituted of an alkaline aluminosilicate with a Si/Al atomic ratio less than or equal to 5, 1 to 60% by weight of active carbon, 0.02 to 2% by weight of at least one metal chelate and 0 to 20% by weight of at least one organic or mineral binding agent, has a basicity determined according to the 2896 ASTM standard with 20 milligrams of potash per gram and a total BET surface area of 10 $m^2g^{-1}$, and contains inside its pore structure a permanent aqueous phase representing 0.1 to 40% by weight of dry catalyst.

25 Claims, No Drawings

PROCESS FOR SWEETENING PETROLEUM CUTS WITHOUT REGULAR ADDITION OF ALKALINE SOLUTION USING A BASIC SOLID CATALYST

This application is a continuation of application Ser. No. 08/105,998, filed Aug. 13, 1993, abandoned.

BACKGROUND OF THE INVENTION

The present invention is concerned with the sweetening, in a fixed bed, of petroleum cuts by catalytic oxidation into disulfides of the mercaptans which they contain.

Theoretically, oxidation of this kind can be carried out easily by mixing the petroleum cut to be treated and an aqueous solution therefor an alkaline base, such as sodium, wherein a catalyst with a metal chelate base is added, in the presence of an oxidizing agent. The petroleum cut and the aqueous solution of the alkaline base are not miscible. The successive stages in the transformation of the mercaptans into disulfides is produced at the interface of the two liquid phases:

transformation of the mercaptans into mercaptides according to the reaction:

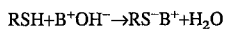

$$RSH + B^+OH^- \rightarrow RS^-B^+ + H_2O$$

where $B^+$ is the cation of the base under consideration ($Na^+$ or $K^+$, for example), oxidation of the mercaptides and their transformation into disulfides according to the reaction:

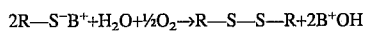

$$2R-S^-B^+ + H_2O + \tfrac{1}{2}O_2 \rightarrow R-S-S-R + 2B^+OH$$

The capacity of the mercaptans to be oxidized and thus their ability to be transformed into disulfides is dependent on their chemical structure. As a general rule, the greater the number of carbon atoms in the aliphatic chain of the mercaptan, the greater its reactivity.

In the case of petroleum cuts containing mercaptans which are difficult to oxidize, particularly if the content of these latter is high (some petrol cuts and kerosene cuts, for example), it is preferable to treat these petroleum cuts with a supported catalyst in the presence of an alkaline base and of an oxidizing agent. A process of this kind is often called a "sweetening process in fixed bed". The alkaline base which is usually used is most frequently sodium in aqueous solution; it is introduced into the reaction medium either continuously or intermittently to maintain the alkaline conditions and the aqueous phase, both of which are necessary for the oxidation reaction. The oxidizing agent which is usually air is mixed with the petroleum cut to be sweetened. The metal chelate used as a catalyst is usually a metal phthalocyanine, such as cobalt phthalocyanine, for example. The reaction is usually carried out at a pressure of between $5 \cdot 10^5$ and $30 \cdot 10^5$ Pascals, at a temperature of between 20° and 70° C. It is well known to the skilled person that when the temperature is above about 70° C., the stability of the catalyst with a metal chelate base is rapidly reduced, causing degradation in the efficiency of the sweetening reaction.

Moreover, it is appropriate to renew the sodium solution which is used up, firstly because of the impurities from the charge which are dissolved in the solution and which make it unsuitable for recycling, and secondly because of the variation in concentration of the base which is reduced due to the water brought by the charge and due to the transformation of the mercaptans into disulphides.

To overcome this problem, a proposal has been made (in particular in the patents FR 2,343,043, U.S. Pat. No. 4,498,9078, and U.S. Pat. No. 4,502,949) to suppress the use of aqueous sodium (or aqueous base). However, so that the reaction can take place in the usual way, the active sites of the support must be placed in contact with the mercaptans present in the petroleum charge, which presupposes a homogeneous medium and thus the absence of an aqueous solution. However, apparently the molecules of water already present in the charge and particularly those produced during the reaction promote the appearance on the surface of the catalyst of an aqueous solution, which, if kept beyond a certain threshold causes a reduction in catalytic activity. A proposal has therefore been made either to incorporate a solid desiccant into the support (U.S. Pat. No. 4,498,978), or to resorb this aqueous phase periodically by drying the catalyst using a polar solvent miscible in water, such as an alcohol (FR Patent 2,640,636). However, these solutions, despite being efficient, are inevitably quite expensive to use.

The prior art mentions a large number of supports which can be used to make a catalyst capable of constituting a fixed bed, including:

active carbons obtained by pyrolysis of wood, peat, lignite, bone or various other carbonaceous materials;

clays and natural silicates, such as diatomaceous earth, fuller's earth, kieselguhr, attapulgite, feldspar, montmorillonite, halloysite and kaolin, and natural or synthesized refractory mineral oxides, such as silica, zirconium oxide, thorium, boron or mixtures thereof.

Significant improvements enabling a partial or complete remedy to the aforementioned problems have been proposed in various patents, as follows: EP 376,744, EP 252,853 and FR 2,651,791. These patents mention the use of solid catalysts constituted of a support containing:

60% to 90% by weight of a mineral matrix, 5 to 35% by weight of pyrolysed carbon or active carbon, and 0.05 to 10% by weight of metal chelate. These catalysts can work with a water content of between 0.1 and 50% by weight of the support, and they do not require an aqueous alkaline solution to be added continuously. The mineral part of the support can be selected from a group of constituents including aluminas, clays, aluminosilicates and silicates.

These latter catalysts, despite offering some progress compared with prior art catalysts are only really effective with charges which have relatively low contents of mercaptans (<400 ppm approx.). They prove to be ineffective with charges reputed as being difficult, and show a rapid fall (by a few days or a few dozen days) in activity. In view of such unfavorable conditions, it can be necessary to continuously add small amounts of alkaline aqueous solution which adversely affects the process employing catalysts and which results in liquid rejection (sodium solution containing impurities, in particular) which produces the same problems as those already mentioned hereinabove.

SUMMARY OF THE INVENTION

In the present invention it has been discovered that this problem was able to be avoided, even eliminated, by using a catalyst wherein the basic matrix is obtained by incorporating an alkaline ion ($Na^+$, $K^+$) into a mixed oxide structure which is essentially constituted of aluminium oxides and silicon oxides combined.

Said aluminosilicates of alkaline metals, more particularly of sodium and/or potassium, characterised by an Si/Al atomic ratio in their structure which is less than or equal to 5 (that is to say a SiO$_2$/Al$_2$O$_3$ molar ratio which is less than or equal to 10) are clearly more effective than the other mineral compounds cited hereinabove. These aluminosilicates which are closely linked to the active carbon and to a metal chelate show optimum sweetening catalytic performances when the hydration level of the catalyst is between 0.1 and 40%, preferably between 1 and 25% by weight thereof.

In addition to their greater catalytic performance, these alkaline aluminosilicates are advantageous in that they are of very low solubility in aqueous medium, which allows prolonged use thereof in the hydrated state in treating the petroleum cuts to which a little water, or possibly aqueous alkaline solution, is added at regular intervals. This is not the case with mineral compounds of the alkaline silicate, or alkaline aluminate kind.

Thus, the sweetening process, in a fixed bed, of petroleum cuts containing mercaptans according to the invention can be defined, generally speaking, as comprising contacting, under oxidation conditions, the petroleum cut to be treated with a porous catalyst comprising 10 to 98%, preferably 50 to 95% by weight, of at least one mineral solid phase constituted of an alkaline aluminosilicate with a Si/Al atomic ratio which is less than or equal to 5, preferably less than or equal to 3, 1 to 60% by weight of active carbon, 0.02 to 2% by weight of at least one metal chelate and 0 to 20% by weight of at least one mineral or organic binding agent. This porous catalyst has a basicity determined in accordance with the 2896 ASTM standard of above 20 milligrams of potash per gram and a total BET surface area of above 10 m$^2$g$^{-1}$, and inside its pore structure it contains a permanent aqueous phase representing 0.1 to 40%, preferably 1 to 25% by weight of the dry catalyst.

Of these basic mineral phases of the aluminosilicate type, mainly sodium and/or potassium, which are particularly suitable, mention can be made, in particular, of a large number of phases (the majority of which are described in the work by R. M. BARRER: Zeolites and Clay Minerals as Sorbents and Molecular Sieves, Acad. Press. 1978):

when the alkali is mainly potassium;

kaliophilite: K$_2$O, Al$_2$O$_3$, a SiO$_2$ (1.8<a<2.4);

the feldspathoid called leucite: K$_2$O, Al$_2$O$_3$, a SiO$_2$ (3.5<a<4.5);

the zeolites of the type:
phillipsite: (K, Na)O, Al$_2$O$_3$, a SiO$_2$ (3.0<a<5.0);

erionite or offretite: (K, Na, Mg, Ca)O, Al$_2$O$_3$, a SiO$_2$ (4<a<8);

mazzite or Omega zeolite (W): (K, Na, Mg, Ca) O, Al$_2$O$_3$, a SiO$_2$ (4<a<8);

L zeolite: (K, Na)O, Al$_2$O$_3$, a SiO$_2$ (5<a<8).

when the alkali is sodium:

the amorphous sodium aluminosilicates, the crystalline organization of which cannot be detected by X diffraction analysis, and the Si/Al atomic ratio of which is less than or equal to 5, preferably less than or equal to 3;

sodalite: Na$_2$O, Al$_2$O$_3$, a SiO$_2$ (1.8<a<2.4);

As far as sodalite is concerned, various different types are known containing ions or various alkaline salts trapped in the structure can be prepared. These varieties are suitable for the present invention. The following are examples of ions or molecules which can be introduced into the structure during synthesis: Cl$^-$, Br$^-$, ClO$_3^-$, BrO$_3^=$, IO$_3$, NO$_3$, OH$^-$, CO$^{2-}_3$, SO$_3^{2-}$, SO$_3^{2-}$, CrO$_4^{2-}$, MoO$_4^{2-}$, PO$_4^{3-}$, etc. in the form of alkaline salts, particularly sodium. The varieties which are particularly preferable in the present invention are those containing the OH$^-$ ion in the form of NaOH and the S$^{2-}$ ion in the form of Na$_2$S.

— nepheline: Na$_2$O, Al$_2$O$_3$, aSiO$_2$ (1.8<a<2.4);

— tectosilicates of the following type:
sodalite,
analcime,
natrolite,
mesolite,
thomsonite,
clinoptilolite,
stilbite,
Na-P1 zeolite,
dachiardite,
chabasite,
gmelinite,
cancrinite,
faujasite comprising the synthetic zeolites X and Y,
A zeolite.

Preferably, said alkaline aluminosilicate is obtained by reacting in aqueous medium at least one clay (kaolinite, halloysite, montmorillonite, etc.) with at least one compound (hydroxide, carbonate, acetate, nitrate, etc.) of at least one alkaline metal, in particular sodium and/or potassium, this compound preferably being hydroxide, followed by a heat treatment at a temperature between 90° and 600° C., preferably between 120° and 350° C.

Clay can also be treated thermally and crushed before being placed in contact with the alkaline solution. Thus, kaolinite and all the heat transformation products thereof (metakaolin, inverse spinel phase, mullite) can be used according to the process of the invention.

When the clay in question is kaolin, kaolinite and/or metakaolin constitute the preferred base chemical reagents.

Like metal chelate, it is possible to deposit on the support any chelate used for this purpose in the prior art, particularly phthalocyanines, porphyrines or metal corrines. Particularly preferable are cobalt phthalocyanine and vanadium phthalocyanine. Use is preferably made of metal phthalocyanine in the form of a derivative, wherein there is a particular preference for the sulphonates thereof available commercially, such as cobalt phthalocyanine mono- or disulphonate and mixtures of these.

The reaction conditions used in carrying out the process of the invention differ mainly from the conditions known in prior art processes by the absence of aqueous base, higher temperature and faster spatial speed per hour. Generally speaking, the conditions used are as follows:

— temperature: 20° to 100° C.

— pressure: 10$^5$ to 30.10$^5$ Pascal,

— amount of air oxidising agent: 1 to 3 kg/kg mercaptans,

— spatial speed per hour in v.v.h. (volume of charge per volume of catalyst and per hour): 1 to 10.

The water content of the catalyst used in the present invention can vary during the operation in two different directions:

1) If the petroleum cut to be sweetened is dried beforehand, it can draw in gradually, by dissolving it, water which is present inside the pore structure of the catalyst. Under these conditions, the water content decreases regularly, and can thus decrease below the limit value of 0.1% by weight.

2) Inversely, if the petroleum cut to be sweetened is saturated with water, and in view of the fact that the sweetening reaction is accompanied by the production of one water molecule per molecule of disulphide formed, the water content of the catalyst can increase and attain values above 25% and in particular 40% by weight, at which values the efficiency of the catalyst is impaired.

In the first instance, a sufficient amount of water can be added to the petroleum cut upstream of the catalyst continuously or discontinuously to keep the hydration degree within the desired range.

In the second instance, it is sufficient to keep the temperature of the charge fixed at a sufficient value, less than 80° C., to solubilize the water of the reaction resulting from transformation of the mercaptans into disulphides. The temperature of the charge is thus selected in such a way as to keep the water content of the support is kept between 0.1 and 40% by weight of the support, preferably between 1 and 25% by weight thereof.

This range of preselected values for the water contents of the support will, of course, depend oh the very nature of the catalytic support used during the sweetening reaction. In fact, according to the patent FR 2,651,791 if a number of catalytic supports are capable of being used without aqueous sodium (or without an aqueous base), they will only become active when their water content (also called hydration content of support) is kept within a relatively restricted range of values which can vary depending on the supports, but which is seen to be associated with the silicate content of the support and structure of its pores.

It has also been observed during various tests that by adding a cationic surfactant such as tetraalkylammonium hydroxide $N(R)_4OH$ to the charge it is possible to significantly improve the efficiency of the catalysts of the present invention. Surfactants such as these are added to the charge in the form of an aqueous solution containing between 0.01 and 50% by weight, for example, and preferably 0.1 to 10% by weight of surfactant. In this case, the additions to the charge advantageously replace the adding of water described hereinabove.

EXAMPLES

An embodiment of the invention will be described hereinafter in detail, as a non-limitative example:

In this embodiment, the reactor is supplied with the petroleum cut to be sweetened in which the oxidizing agent which may be air is introduced directly. The petroleum cut treated is removed through a line which supplies a filter system intended to remove traces of water and incipient sulphur often produced during oxidation of the mercaptans and not retained by the support. The treated charge is then transferred through to a storage chamber.

According to the invention, measuring probes which are placed upstream and downstream of the reactor respectively permit a continuous calculation of the water and mercaptans content to be made at the intake and outlet of the reactor. It is thus possible to continuously check whether the water content of the catalytic support is increasing or decreasing. Corrective measures can then be taken by modifying the amount of heat supplied to the charge by a heat exchanger placed over the line upstream of the reactor.

The following examples illustrate the present invention without limiting the scope thereof. Examples 3 and 4 describe the preparation of catalysts tested as comparisons.

EXAMPLE 1

Preparation of the Catalyst SX1

200 cm$^3$ of an aqueous solution containing 130 g KOH is added to 272 g dry kaolin marketed by the FONJAC establishments, the degree of purity of which is approx. 83% (main impurities in % by weight: $TiO_2$=0.2; $Fe_2O_3$=0.9; CaO=0.15 $K_2O$=1.5; $Na_2O$=0.1; MgO=0.2; quartz=6.0; micas+feldspathoids=8.0).

The mixture is mixed for a few minutes at ambient temperature and is then brought to 60° C. The liquid paste obtained is then mixed 30 minutes at this temperature of 60° C.

87 g active carbon belonging to the company NORIT with a specific surface area of approx 550 $m^2g^{-1}$ are moistened with 77 cm$^3$ of an aqueous solution containing 20 g KOH.

The active carbon thus moistened is added to the liquid kaolin paste which has been rendered alkaline previously, and they are mixed together for about 30 minutes in a mixer with vanes, and then slightly heated (to about 70° to 80° C.) to bring it to a plastic paste state which permits shaping by extrusion.

The extrudates obtained which are 1.6 mm in diameter and which are cut into lengths of between 3 and 10 mm are dried at 200° C. for 12 hours. The dried extrudates are very hard and very resistant to crushing. X diffraction structural analysis reveals that the structure of the initial kaolinite is completely transformed at the temperature of 200° C. into kaliophilite of the composition $K_2O$, $Al_2O_3$, $2SiO_2$.

The solid which is thus extruded is washed 3 times successively in 2 liters of permuted water at ambient temperature for 30 minutes. It is then immersed in 2 liters of a solution containing 1.0 g per liter of sulphonated cobalt phthalocyanine of the type marketed by the French company PROCATALYSE under the name "LCPS". All this is agitated at ambient temperature for 30 hours; the solid is then filtered and washed once in 1 liter of distilled water at ambient temperature.

This catalyst contains approximately 20% by weight carbon, 18.5% by weight potassium, 32.5% by weight silica, and 4.9% by weight LCPS per kg of support.

Its surface area is 125 $m^2$ $g^{-1}$ and its basicity is above 80 mg. KOH per g.

This catalyst is then dried slowly at 50° C. in a stove until it has a residual water content of 6% by weight. This catalyst is called SX1.

EXAMPLE 2

Preparation of the SX2 Catalyst

First of all, a liquid paste is prepared, as described in Example 1, which is constituted of 187 g dry kaolin and 135 cm$^3$ of a solution containing 90 g KOH potash. This paste is mixed at 60° C. for 15 minutes.

60 cm$^3$ of a solution containing 33 g of silica in the form of commercial potassium orthosilicate is added to 87 g active carbon. 40 cm$^3$ of a solution containing 28 g alumina in the form of aluminium nitrate is then added. This mixture is mixed at 50° C. for 30 minutes. 40 cm$^3$ of a solution is then added containing 30 g KOH. All this is then mixed for about 30 minutes.

The kaolin paste which is rendered alkaline is then mixed with the combination of active carbon and amorphous potassium silicoaluminate. All this is mixed for 15 minutes, and is then slightly heated to bring it to a plastic paste state permitting easy extrusion.

The support in the form of extrudates thus obtained is then subjected to the same treatments as in Example 1.

The catalyst resulting from these treatments contains approx.:

20% by weight carbon, 14.5% by weight potassium, and 4.8 g LPCS per kg of support.

Its surface area is 131 $m^2 g^{-1}$ and its basicity is greater than 60 mg. KOH per g.

X diffraction structural analysis of the catalyst obtained reveals that here too the mineral part is essentially constituted of kaliophilite.

The catalyst is then dried slowly at 50° C. in a stove until it reaches a residual water content of 8% by weight. This catalyst is called the SX2 catalyst.

EXAMPLE 3

Preparation of the SX3 Catalyst

200 $cm^3$ of an aqueous solution containing 102 g NaOH is added to 272 g dry kaolin marketed by the FONJAC establishments, the degree of purity of the dry kaolin being about 83% (main impurities in % by weight: $TiO_2$=0.2; $Fe_2O_3$=0.9; CaO=0.15; $K_2O$=1.5; $Na_2O$=0.1; MgO=0.2; quartz=6.0; micas+feldspathoids=8.0).

The mixture is mixed for a few minutes at ambient temperature and is then brought to 60° C. The liquid paste which is obtained is then mixed for 30 minutes at this temperature of 60° C.

87 g active carbon of the company NORIT with a specific surface area of approx. 550 $m^2 g^{-1}$ is moistened with 77 $cm^3$ of an aqueous solution containing 17 g NaOH.

The active carbon moistened thus is added to the liquid paste of kaoline which has been rendered alkaline beforehand and all of this is mixed for about 30 minutes in a mixer with vanes and is then slightly heated (to about 70° to 80° C.) to bring it to a plastic paste state permitting shaping by extrusion.

The extrudates obtained are 1.6 mm in diameter and are cut into lengths of between 3 and 10 mm, and dried at 200° C. for 12 hours. The dried extrudates are very hard and very resistant to crushing. X diffraction structural analysis reveals that the structure of the initial kaolin is completely transformed at the temperature of 200° C. into a compound of the sodalite type of composition $Na_2O$, $Al_2O_3$, $2SiO_2$.

The solid which is thus extruded is washed 3 times successively in 2 liters permuted water, at ambient temperature for 30 minutes. It is then immersed in 2 liters of a solution containing 1.0 g per liter of sulphonated cobalt phthalocyanine of the type marketed by the French company PROCATALYSE under the name "LCPS".

All these are agitated at ambient temperature for 30 hours; the solid is then filtered and washed once in 1 liter distilled water at ambient temperature.

This catalyst contains approx.

20% by weight carbon

9% by weight sodium 32.5% by weight silica, and 4.9 g LCPS per kg of support

Its surface area is 125 $m^2g^{-1}$ and its basicity is greater than 100 mg. KOH per g.

The catalyst is then dried slowly at 50° C. in a stove until it Peaches a residual water content of less than 7% by weight. This catalyst is called SX3.

EXAMPLE 4

Preparation of the SX4 Catalyst 100 g active carbon are wetted with 88 $cm^3$ of an aqueous solution. 400 g alumina $Al_2O_3$ in the form of powder pseudoboehmite and marketed under the name of "gel Condéa SB3" by the company CONDEA is acidified with 580 $cm^3$ of a solution containing 28 g pure nitric acid.

The moistened active carbon is added to the acidified alumina, and is mixed for 30 minutes until a homogeneous paste is obtained. The product is then dried at 70°–80° C. for a few minutes, with it being mixed to obtain a thick extrudable paste. After extrusion, the product is dried at 200° C. in air for 12 hours and then calcined at 500° C. in nitrogen for 2 hours.

The support, thus obtained, in the form of extrudates is then subjected to the same treatments as in Examples 1 and 2.

The catalyst resulting from these treatments contains about:

20% by weight carbon, and 3.8 g LCPS per kg of support.

Its surface area is 282 $m^2g^{-1}$ and its basicity is 10 mg. KOH per g.

It is dried slowly at 50° C. in a stove until it reaches a residual water content of 6% by weight. It will be called SX4 hereinafter.

EXAMPLE 5

Preparation of Catalyst SX5

100 g active carbon are moistened with 88 $cm^3$ of an aqueous solution containing 10 g KOH.

400 g alumina $Al_2O_3$ in the form of powder pseudoboehmite marketed under the name of "gel Condéa SB3" by the company CONDEA is acidified with 540 $cm^3$ of a solution containing 28 g pure nitric acid.

The moistened active carbon which has been rendered alkaline is added to the acidified alumina and the mixture is mixed for 30 minutes to obtain a homogeneous paste. 40 $cm^3$ of a solution containing 10 g KOH is then added slowly by mixing. It is mixed for another 30 minutes, and then dried at 70°–80° C. until a thick extrudable paste is obtained. After extrusion, the solid is dried at 200° C. in nitrogen for 2 hours.

The support thus obtained, in the form of extrudates, is then subjected to the same treatments as those in Examples 1, 2 and 3.

The catalyst resulting from these treatments contains approximately:

20% by weight carbon 2.6% by weight potassium and 5.1 g LCPS per kg of support.

Its surface area is 244 $m^2g^{-1}$ and its basicity is 16 mg. KOH per g.

The catalyst is then dried slowly at 50° C. in a stove until it reaches a residual water content of 6% by weight. It is called SX5 hereinafter.

EXAMPLE 6

Evaluation and Comparison of the Properties of the SX1, SX2, SX3, SX4 and SX5 Catalysts in a Test for Sweetening Petroleum Cuts The charge used for the sweetening test is a kerosene obtained from a crude Iranian light. The properties of the kerosene are given in Table 1 hereinafter:

TABLE 1

PROPERTIES OF THE KEROSENE TO BE SWEETENED

| | |
|---|---|
| R—SH (ppm) | 1.67 |
| TAN (mg KOH/g) | 0.050 |
| SAYBOLT COLOUR | 25 |
| TOTAL SULPHUR % by weight | 0.285 |
| INITIAL POINT °C. | 151 |
| FINAL POINT °C. | 243 |
| VOLUMETRIC MASS g/l | 0.8 |
| WATER CONTENT (ppm) | 150 |
| PHENOLS (ppm) | 610 |
| THIOPHENOLS (ppm) | <10 |

The 5 catalysts are evaluated and compared on this charge under the following operating conditions:

— Temperature=40° C.
— Pressure=0.7 MPa (7 bars) relative
— VVH=variable from 1 to 7 (hour)$^{-1}$
— flow of air=variable from 1 to 1.2 times the stoichiometry of the reaction.
— addition of water to the charge at a rate of 1 cm$^3$ per kg of charge.

The results obtained under these conditions over several dozen or hundreds of hours testing depending on the case at hand with the SX1, SX2, SX3, SX4 and SX5 catalysts are shown in Tables 2, 3, 4, 6 and 7 respectively.

Table 5 shows the performance of the SX3 catalyst, all other conditions being the same, when, after 2000 hours of testing, the adding of water is replaced by the adding of an aqueous solution containing 2% by weight of ammonium tetrabutyl hydroxide N(Bu)$_4$OH.

TABLE 2

RESULTS OBTAINED WITH THE CATALYST SX1

| TIME (hour) | TEMP (°C.) | PRESSURE (Bars rel) | STOICH. | VVH (hour − 1) | R—SH (ppm) | DOCTOR Test |
|---|---|---|---|---|---|---|
| 0 | 40 | 7 | 1.2 | 1 | | |
| 13 | 40 | 7 | 1.2 | 1 | 5.5 | negative |
| 37 | 40 | 7 | 1.2 | 1 | 0.5 | negative |
| 45 | | | passage with VVH = 1.7 | | | negative |
| 61 | 40 | 7 | 1.2 | 1.7 | 0.5 | negative |
| 85 | 40 | 7 | 1.2 | 1.7 | 0.9 | negative |
| 109 | 40 | 7 | 1.2 | 1.7 | 0.9 | negative |
| 133 | 40 | 7 | 1.2 | 1.7 | 0.6 | negative |
| 135 | | Passage with VVH = 1.7 & stoichiometry = 1.1 | | | | negative |
| 159 | 40 | 7 | 1.1 | 1.7 | 1.6 | negative |
| 183 | 40 | 7 | 1.1 | 1.7 | 1.7 | negative |
| 184 | | Passage with stoichiometry = 1 | | | | negative |
| 207 | 40 | 7 | 1.0 | 1.7 | 0.8 | negative |
| 231 | 40 | 7 | 1.0 | 1.7 | 1 | negative |
| 251 | 40 | 7 | 1.0 | 1.7 | 1.4 | negative |
| 275 | 40 | 7 | 1.0 | 1.7 | 1.8 | negative |
| 299 | 40 | 7 | 1.0 | 1.7 | 0.4 | negative |
| 323 | 40 | 7 | 1.0 | 1.7 | 1.5 | negative |
| 347 | 40 | 7 | 1.0 | 1.7 | 1.2 | negative |
| 371 | 40 | 7 | 1.0 | 1.7 | 1.1 | negative |

TABLE 3

RESULTS OBTAINED WITH THE CATALYST SX2

| TIME (hours) | TEMP (°C.) | PRESSURE (Bars rel) | STOICH. | VVH (hour −1) | R—SH (ppm) | DOCTOR Test |
|---|---|---|---|---|---|---|
| 0 | 40 | 7 | 1.0 | 1.7 | | |
| 15 | 40 | 7 | 1.0 | 1.7 | 1.1 | negative |
| 38 | 40 | 7 | 1.0 | 1.7 | 3.1 | negative |
| 50 | 40 | 7 | 1.0 | 1.7 | 0.5 | negative |
| 62 | 40 | 7 | 1.0 | 1.7 | 0.7 | negative |
| 110 | 40 | 7 | 1.0 | 1.7 | 0.9 | negative |
| 130 | 40 | 7 | 1.0 | 1.7 | 0.9 | negative |
| 155 | 40 | 7 | 1.0 | 1.7 | 1.0 | negative |
| 182 | 40 | 7 | 1.0 | 1.7 | 0.8 | negative |
| 207 | 40 | 7 | 1.0 | 1.7 | 1.2 | negative |
| 230 | 40 | 7 | 1.0 | 1.7 | 1.1 | negative |
| 243 | 40 | 7 | 1.0 | 1.7 | 0.8 | negative |
| 265 | 40 | 7 | 1.0 | 1.7 | 0.9 | negative |
| 275 | 40 | 7 | 1.0 | 1.7 | 0.9 | negative |
| 310 | 40 | 7 | 1.0 | 1.7 | 1.0 | negative |
| 320 | 40 | 7 | 1.0 | 1.7 | 1.2 | negative |
| 380 | 40 | 7 | 1.0 | 1.7 | 1.2 | negative |

TABLE 4

RESULTS OBTAINED WITH THE CATALYST SX3

| TIME (hours) | TEMP (°C.) | PRESSURE (Bars rel) | STOICH. | VVH (hour −1) | R—SH (ppm) | DOCTOR Test |
|---|---|---|---|---|---|---|
| 0 | 40 | 7 | 1.0 | 1.7 | | |
| 15 | 40 | 7 | 1.0 | 1.7 | 1.1 | negative |
| 35 | 40 | 7 | 1.0 | 1.7 | 2.2 | negative |
| 45 | 40 | 7 | 1.0 | 1.7 | 0.7 | negative |
| 108 | 40 | 7 | 1.0 | 1.7 | 1.0 | negative |
| 152 | 40 | 7 | 1.0 | 1.7 | 1.0 | negative |
| 210 | 40 | 7 | 1.0 | 1.7 | 1.2 | negative |
| 258 | 40 | 7 | 1.0 | 1.7 | 1.1 | negative |
| 315 | 40 | 7 | 1.0 | 1.7 | 1.0 | negative |
| 410 | 40 | 7 | 1.0 | 1.7 | 1.5 | negative |
| 492 | 40 | 7 | 1.0 | 1.7 | 1.8 | negative |

TABLE 4-continued

RESULTS OBTAINED WITH THE CATALYST SX3

| TIME (hours) | TEMP (°C.) | PRESSURE (Bars rel) | STOICH. | VVH (hour −1) | R—SH (ppm) | DOCTOR Test |
|---|---|---|---|---|---|---|
| 507 | 40 | 7 | 1.0 | 1.7 | 1.7 | negative |
| 600 | 40 | 7 | 1.0 | 1.7 | 1.8 | negative |
| 705 | 40 | 7 | 1.0 | 1.7 | 2.1 | negative |
| 812 | 40 | 7 | 1.0 | 1.7 | 2.4 | negative |
| 904 | 40 | 7 | 1.0 | 1.7 | 2.8 | negative |
| 1020 | 40 | 7 | 1.0 | 1.7 | 3.9 | negative |
| 1950 | 40 | 7 | 1.0 | 1.7 | 7.3 | positive |

TABLE 5

RESULTS OBTAINED WITH THE CATALYST SX3 WITH THE ADDITION OF A CATIONIC SURFACE-ACTIVE AGENT, AMMONIUM TETRABUTYL HYDROXIDE (N(Bu)$_4$OH).

| Time (hours) | Temperature (°C.) | Pressure Bars rel. | Stoich. | WH (hour −1) | R—SH ppm | Doctor test |
|---|---|---|---|---|---|---|
| 1020 | 40 | 7 | 1.0 | 1.7 | 3.9 | negative |
| 1950 | 40 | 7 | 1.0 | 1.7 | 7.3 | positive |
| 2000 | 40 | 7 | 1.0 | 1.7 | 7.5 | positive |
| 2001 | Addition of N(Bu)$_4$OH | | | | | |
| 2050 | 40 | 7 | 1.0 | 1.7 | 3.1 | negative |
| 2106 | 40 | 7 | 1.0 | 1.7 | 2.4 | negative |
| 2203 | 40 | 7 | 1.0 | 1.7 | 2.5 | negative |
| 2298 | 40 | 7 | 1.0 | 1.7 | 2.7 | negative |
| 2415 | 40 | 7 | 1.0 | 1.7 | 3.2 | negative |
| 2620 | 40 | 7 | 1.0 | 1.7 | 3.3 | negative |
| 2625 | Stop addition N(Bu)$_4$OH | | | | | |
| 2702 | 40 | 7 | 1.0 | 1.7 | 3.4 | negative |
| 2807 | 40 | 7 | 1.0 | 1.7 | 3.4 | negative |
| 2918 | 40 | 7 | 1.0 | 1.7 | 3.7 | negative |
| 3005 | 40 | 7 | 1.0 | 1.7 | 4.0 | negative |

TABLE 6

RESULTS OBTAINED WITH THE CATALYST SX4

| TIME (hours) | TEMP (°C.) | PRESSURE (Bars rel) | STOICH. | VVH (hour −1) | R—SH (ppm) | DOCTOR Test |
|---|---|---|---|---|---|---|
| 0 | 40 | 7 | 1.0 | 1.7 | — | — |
| 10 | 40 | 7 | 1.1 | 1.7 | 6.5 | positive |
| 20 | 40 | 7 | 1.2 | 1.0 | 10.0 | positive |
| 40 | 40 | 7 | 1.2 | 1.0 | 18.1 | positive |
| 55 | 40 | 7 | 1.2 | 1.0 | 30.5 | positive |
| 80 | 40 | 7 | 1.2 | 1.0 | 45.5 | positive |
| 95 | 40 | 7 | 1.2 | 1.0 | 62.0 | positive |

TABLE 7

RESULTS OBTAINED WITH THE CATALYST SX5

| TIME (hours) | TEMP (°C.) | PRESSURE (Bars rel) | STOICH. | VVH (hour −1) | R · SH (ppm) | DOCTOR Test |
|---|---|---|---|---|---|---|
| 0 | 40 | 7 | 1.0 | 1.7 | | |
| 13 | 40 | 7 | 1.0 | 1.7 | 2.2 | negative |
| 25 | 40 | 7 | 1.0 | 1.7 | 4.1 | negative |
| 42 | 40 | 7 | 1.1 | 1.0 | 5.5 | positive |
| 50 | 40 | 7 | 1.2 | 1.0 | 9.5 | positive |
| 82 | 40 | 7 | 1.2 | 1.0 | 14.1 | positive |
| 105 | 40 | 7 | 1.2 | 1.0 | 20.8 | positive |

In the light of these results, it is clear that the SX1, SX2, and SX3 catalysts according to the present invention have sweetening properties for the kerosene charge which is used here which are clearly superior to those of the SX4 and SX5 catalysts. In particular, there is a noticeable improvement in their performance in converting the mercaptans into disulphides and the stability of their efficiency over the course of time.

We claim:

1. A process for sweetening a petroleum cut containing mercaptans comprising subjecting said petroleum cut to oxidation conditions by contacting the cut with a porous catalyst in the presence of air, wherein said catalyst comprises 10 to 98% by weight of at least one solid mineral phase which is an alkaline zeolite or tectosilicate with a Si/Al atomic ratio which is less than or equal to 5, 1 to 60% by weight active carbon, 0.02 to 2% by weight of at least one metal chelate and 0 to 20% by weight of at least one mineral or organic binding agent, said catalyst having a basicity determined according to ASTM standard 2896 which is above 70 mg of potash per gram, a total BET surface area which is greater than 10 m$^2$g$^{-1}$, and inside its pore structure a hydration rate which is 0.1 to 40% by weight of dry catalyst.

2. A process according to claim 1, wherein the Si/Al ratio of the alkaline zeolite or tetosilicate is less than or equal to 3.

3. A process according to claim 1, wherein the alkaline zeolite or tectosilicate is a sodium or a potassium zeolite or tectosilicate.

4. A process according to claim 3, wherein the sodium zeolite or tectosilicate is a sodalite compound of the approximate formula $Na_2O$, $Al_2O_3$, a $SiO_2$, with a value of 1.8 to 2.4.

5. A process according to claim 3, wherein the sodium or potassium zeolite or tectosilicate is obtained by reacting in aqueous medium at least one clay with at least one of sodium hydroxide or potassium hydroxide, followed by a heat treatment at a temperature of between 90° and 600° C.

6. A process according to claim 5, wherein the clay is activated thermally beforehand, and then crushed before it is placed in contact with the sodium hydroxide or potassium hydroxide in aqueous media.

7. A process according to claim 3, wherein the alkaline zeolite or tectosilicate is at least partially a zeolite, the major part of which, at least, contains sodium.

8. A process according to claim 1, wherein the alkaline zeolite or tectosilicate represents 50 to 95% by weight of sweetening catalyst, calculated in relation to the weight of dry catalyst.

9. A process according to claim 1, wherein the metal chelate contained in the catalyst is a cobalt phthalocyanine.

10. A process according to claim 1, wherein the hydration rate is between 1 and 25% by weight relative to the dry catalyst.

11. A process according to claim 1, wherein the temperature is between 20° and 100° C., the pressure $10^5$ to $30.10^5$ Pa, the proportion of air is from 1 to 3 kg/kg of mercaptans and the hourly space velocity is 1 to 10 v.v.h.

12. A process according to claim 1, wherein an anionic or cationic surface-active agent is added in the form of an aqueous solution continuously or discontinuously to the charge which is to be sweetened.

13. A process according to claim 1, wherein the surface-active agent is a cationic agent.

14. A process according to claim 1, wherein the temperature is selected in such a way as to maintain the water content of the support within the desired range.

15. A process according to claim 1, wherein the petroleum cut treated is a petrol or a kerosene.

16. A process according to claim 13, wherein the surface-active agent is a quaternary ammonium hydroxide salt.

17. A process according to claim 1, wherein water is added continuously or discontinuously to the process so as to maintain the catalyst within the hydration rate.

18. A process according to claim 10, wherein water is added continuously or discontinuously to the process so as to maintain the catalyst within the hydration rate.

19. A process for sweetening a petroleum cut containing mercaptans comprising subjecting said petroleum cut to oxidation conditions by contacting the cut with a porous catalyst in the presence of air, wherein said catalyst comprises 10 to 98% by weight of at least one solid mineral phase which is an alkaline zeolite or tectosilicate with a Si/Al atomic ratio which is less than or equal to 5, 1 to 60% by weight active carbon, 0.02 to 2% by weight of at least one metal chelate and 0 to 20% by weight of at least one mineral or organic binding agent, said catalyst having a basicity determined according to ASTM standard 2896 which is above 100 mg of potash per gram, a total BET surface area which is greater than 10 $m^2g^{-1}$, and inside its pore structure a hydration rate of 0.1 to 40% by weight of dry catalyst.

20. A process according to claim 19, wherein the hydration rate is between 1 and 25% by weight relative to the dry catalyst.

21. A process according to claim 1, wherein the basicity of the catalyst is greater than 80 mg of potash per gram.

22. A process according to claim 1, wherein the hydration rate is 10 to 40% by weight.

23. A process according to claim 1, wherein the hydration rate is 20 to 40% by weight.

24. A process according to claim 1, wherein the hydration rate is 25 to 40% by weight.

25. A process for sweetening a petroleum cut containing mercaptans comprising subjecting said petroleum cut to oxidation conditions by contacting the cut with a porous catalyst in the presence of air, wherein said catalyst is homogenous and comprises, closely linked together, 10 to 98% by weight of at least one solid mineral phase which is an alkaline zeolite or tectosilicate with a Si/Al atomic ratio which is less than or equal to 5, 1 to 60% by weight active carbon, 0.02 to 2% by weight of at least one metal chelate and 0 to 20% by weight of at least one mineral or organic binding agent, said catalyst having a basicity determined according to ASTM standard 2896 which is above 70 mg of potash per gram, a total BET surface area which is greater than 10 $m^2g^{-1}$, and inside its pore structure a hydration rate which is 0.1 to 40% by weight of dry catalyst.

* * * * *